United States Patent
Shimizu

[11] Patent Number: 5,794,947
[45] Date of Patent: Aug. 18, 1998

[54] SEALING MATERIAL FOR ASSEMBLY

[75] Inventor: Toru Shimizu, Hachioji, Japan

[73] Assignee: Three Bond Co., Ltd., Japan

[21] Appl. No.: 845,645

[22] Filed: Apr. 25, 1997

Related U.S. Application Data

[63] Continuation of Ser. No. 611,971, Mar. 6, 1996, abandoned, which is a continuation of Ser. No. 168,763, Dec. 16, 1993, abandoned.

[30] Foreign Application Priority Data

Jan. 4, 1993 [JP] Japan .................. 5-000042

[51] Int. Cl.$^6$ .......................................... F16J 15/02
[52] U.S. Cl. .................................. 277/630; 277/651
[58] Field of Search .................... 379/428, 429, 379/433, 437, 440; 361/752, 796; 174/52.3; 277/630, 637, 650, 651

[56] References Cited

U.S. PATENT DOCUMENTS

| | | | |
|---|---|---|---|
| 3,108,818 | 10/1963 | Furstenburg | 277/189 |
| 3,153,541 | 10/1964 | Rudder | 277/180 |
| 3,195,906 | 7/1965 | Moyers | 277/166 X |
| 3,573,872 | 4/1971 | Sannes | 277/180 |
| 3,578,346 | 5/1971 | Jelinek | 277/180 |
| 3,721,452 | 3/1973 | Black | 277/9 |
| 3,874,675 | 4/1975 | Belter et al. | 277/11 |
| 3,986,721 | 10/1976 | Decker | 277/166 |
| 4,002,344 | 1/1977 | Smith | 277/11 |
| 4,158,757 | 6/1979 | Reichert et al. | 277/166 |
| 4,488,009 | 12/1984 | Sherman . | |
| 4,522,536 | 6/1985 | Vidrine | 277/180 X |
| 4,535,996 | 8/1985 | Cardis et al. | 277/166 X |
| 4,674,756 | 6/1987 | Fallon et al. | 277/166 |
| 5,123,661 | 6/1992 | Johnston et al. | 277/166 X |
| 5,170,012 | 12/1992 | Braconier . | |
| 5,183,267 | 2/1993 | Ackerman et al. | 277/166 |
| 5,564,714 | 10/1996 | Katsuno et al. | 277/DIG. 10 |

Primary Examiner—Randolph A. Reese
Assistant Examiner—John L. Beres
Attorney, Agent, or Firm—Samuels, Gauthier, Stevens & Reppert

[57] ABSTRACT

Disclosed is an assembly seal for use in assembly comprising: packing formed in a predetermined shape from an elastic material; a core within the packing for providing substantial rigidity such that can maintain the desired shape of the packing; and a base for supporting the core, the base having substantial rigidity and being connected to the core portion in such a manner that the base can be easily separated from the core by a cutting operation. The assembly seal is used in an assembly method for assembling a plurality of parts into a set of assembled parts incorporating packing. The assembly method comprises the steps of: positioning the assembly seal so that the packing of the assembly seal is positioned at a specified position on one part of a set of assembled parts; separating the base of the assembly seal from the packing; removing the base so that only the packing of the assembly seal is left on said one part; and fitting the other parts of said set of assembled parts to said one part.

5 Claims, 4 Drawing Sheets

SEALING MATERIAL FOR ASSEMBLY

"This is a continuation Ser. No. 08/611,971 filed Mar. 6, 1996 which is a File-Wrapper-Continuation of Ser. No. 08/168,763 filed Dec. 16, 1993 now abandoned".

BACKGROUND OF THE INVENTION

1. Field of the Invention

The present invention relates to a seal for assembled products and to an assembly method, and, in particular, to a highly convenient sealing material used in assembly and to an assembly method used to assemble products such as optical apparatus and electronic or electrical apparatus in which a high degree of airtightness and watertightness is required, such as portable telephones.

2. Description of the Prior Art

In recent years, progress has been made in reducing the size and weight of various types of electronic apparatus and optical products, whereby a large number of parts are incorporated at high density in a small volume. For example, in a portable telephone 1 of which the external appearance is illustrated in FIG.1, a large number of electronic parts are incorporated, completely filling the volume contained between a pair of assembly casings 3 and 5. In an apparatus of this type, airtightness and watertightness of the casing is desired to protect the parts between the casings 3, 5. However, the width of the sealing surface on the edge of the case is extremely small, and also, because the hardness of the material from which the case is formed is not very high, it is difficult to firmly close the casing to obtain adequate airtightness. Accordingly, a narrow seal ring 7 made of an elastic material is normally inserted between the casing 3 and the casing 5 to obtain the necessary airtightness.

The seal ring 7 is normally positioned in a groove provided in the surface of the seal. However, in the casings 3, 5, there are many projections such as hooks or installation bosses, and indentations such as grooves along the seal surface, notches, and the like, so that there is a tendency for the shape of the seal ring to be complicated. Under conditions of this type, when the seal ring is incorporated, it is necessary to precisely fit the seal ring 7 into the groove to unite with this type of indentation to ensure airtightness.

However, because the seal ring is narrow and soft, it is easily deformed. Accordingly, when it is desired to close the casings 3, 5 automatically, the assembly operation fails because of the deformation of the seal ring, or the seal ring frequently breaks. For this reason automatic assembly is very difficult, and, at the present time, this assembly operation is performed manually in actual practice.

SUMMARY OF THE INVENTION

Accordingly, a first object of the present invention is, with due consideration to the drawbacks of such conventional sealing methods, to provide a seal which can be easily incorporated using an automatic assembly process, even if the seal has a complicated shape.

A second object of the present invention is to provide an automatic assembly process whereby a seal of a complicated shape can be precisely incorporated into an assembled product.

The first object of the present invention is achieved by the provision of an assembly seal comprising: packing formed in a desired shape from an elastic material; a core within the packing for providing substantial rigidity such that can maintain the desired shape of the packing; and a base for supporting the core, the base having substantial rigidity and being connected to the core portion so that it can be easily separated from the core by a cutting operation.

The second object of the present invention is achieved by the provision of an assembly process with use of the assembly seal, comprising the steps of: positioning the assembly seal so that the packing of the assembly seal is positioned at a specified position on one part of a set of assembled parts; separating the base of the assembly seal from the packing; removing the base so that only the packing of the assembly seal is left on said one part; and fitting the other parts of said set of assembled parts to said one part.

Use of a seal with a rigid core portion ensures that the shape of the packing is not broken down. Accordingly, even if the seal has a complicated shape, the packing can be incorporated into the assembled part with ease and accuracy. As a result, it is possible to install the packing using an automatic assembly process, and to improve the airtightness and watertightness of an assembled product with a complicated structure. In the assembly process, the base portion connected to the core portion is separated by a cutting operation.

Also, in the above construction, the production of the assembly seal is simplified by forming the base portion and the core portion integrally from the same material. From the aspect of cost and waste material there is an advantage in selecting a reusable material.

BRIEF DESCRIPTION OF THE DRAWINGS

The features and advantages of the sealing material and assembly process according to the present invention over the conventional seal and assembly process will be more clearly understood from the following description of the preferred embodiments of the present invention taken in conjunction with the accompanying drawings in which like reference numerals designate the same or similar elements or sections throughout the FIGURES thereof and in which.

Figure 1:
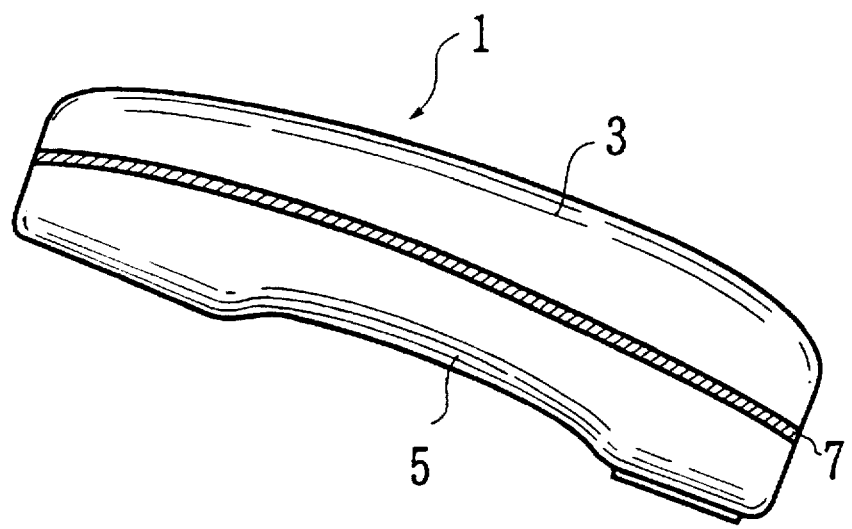
FIG. 1 is a view illustrating the external appearance of n assembled product incorporating packing.

Other features of the present invention will become apparent in the course of the following description of exemplary embodiments which are given for illustration of the invention and are not intended to be limiting thereof.

DETAILED DESCRIPTION OF THE PREFERRED EMBODIMENTS

Referring now to the drawings, preferred embodiments of the sealing material according to the present invention will be described.

Figure 2:
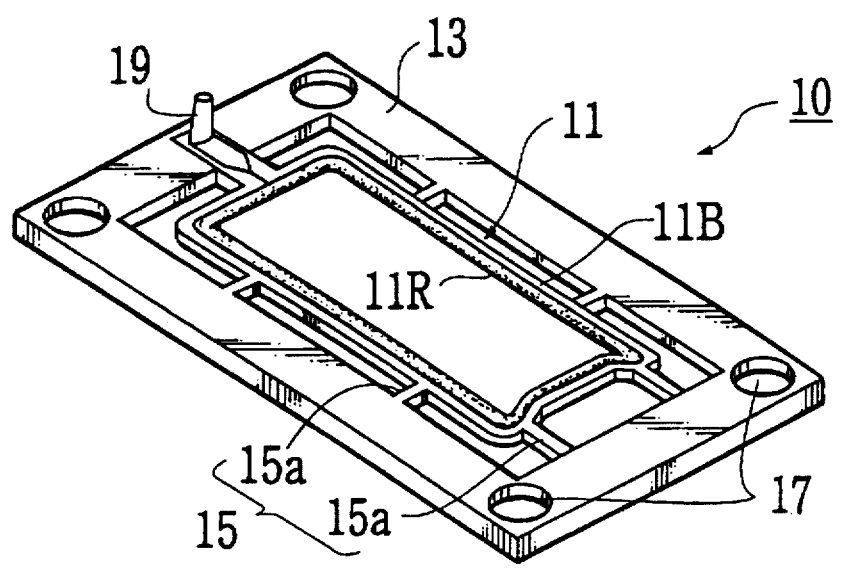
FIG. 2 is a perspective view showing the structure of a first embodiment of the assembly sealing material of the present invention.

FIG. 2 shows an assembly seal 10 of a first embodiment of the present invention. The assembly seal 10 is provided with packing 11 made up of an elastic member 11R and a core portion 11B. The elastic member 11R is formed from an elastic material, such as rubber, in a specified shape for maintaining good airtightness when installed in the assembled product. The core portion 11B is made from a rigid material so that it is difficult to deform the elastic member 11R, and the core portion 11B becomes the core of the packing 11, buried in the elastic member 11R. The assembly seal 1 also has a base portion 13 enclosing the core portion 11B. The base portion 13 is joined to the core portion 11B through a connecting portion 15 comprising a plurality of narrow leaves 15a. The base portion 13 and the connecting portion 15 are also made of a rigid material, therefore the core portion 11B is supported on the base portion 13 by the connecting portion 15.

Figure 3:
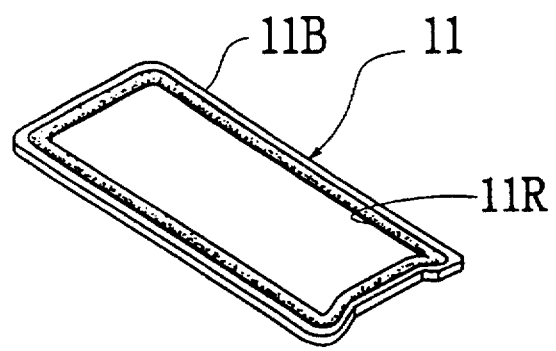
FIG. 3 is a perspective view of the packing separated from a base portion of the assembly seal of FIG. 2.

The core portion 11B, the connecting portion 15, and the base portion 13 are produced from the same rigid material and are integrally formed. A material that is easily cut by mechanical or thermal cutting, such as plastic or the like, is selected as the rigid material. When the narrow leaves 15a are cut, the packing 11 is separated from the base portion 13 as shown in FIG. 3.

Figure 4:
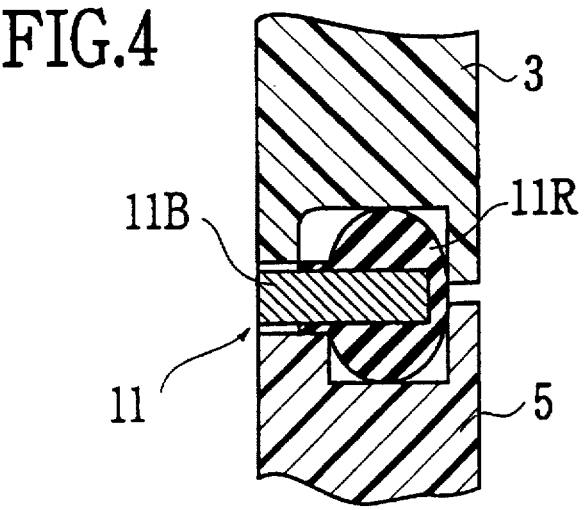
FIG. 4 is a cross-sectional view of the packing incorporated in the assembled product.

In the assembly process for casings 3, 5 which are assembly parts, the assembly seal 10 is positioned on either of the casings 3, 5, and the packing 11 is fitted to the other of the casings 3, 5, suitably positioned on the sealing surface of that casing so that the assembly seal 10 is interposed between the casings 3, 5. Following this, the narrow leaves 15a are cut and the base portion 13 is removed so that only the packing 11 is left between the casings 3, 5, as shown in FIG. 4.

To produce the assembly seal 10, first, the core portion 11B, the base portion 13, and the connecting portion 15 is integrally formed from a rigid material such as a plastic, using a mold. Next, the integrally formed part is inserted into a mold provided with a cavity for forming the elastic member 11R, and an elastic material such as natural rubber, synthetic rubber, silicone rubber, or the like is injected into the mold to form the elastic member 11R on the core portion 11B by injection molding. As a result, the elastic member 11R is integrally formed and compounded on the core portion 11B. The method of fabrication is not restricted to that herein described. Various types of commonly known forming methods can, of course, be utilized. If a thermoplastic resin is used as the rigid material, it is possible to recover and reuse the base portion 13, thereby reducing waste.

Also, a pilot hole 17 is provided in the base portion 13 for positioning the packing when assembling the casings 3, 5 and the assembly seal 10 using an automatic assembly device such as a robot hand. The reference numeral 19 designates a gate formed during injection molding which can be removed at a suitable time, for example, prior to storing the seal.

Figure 5:
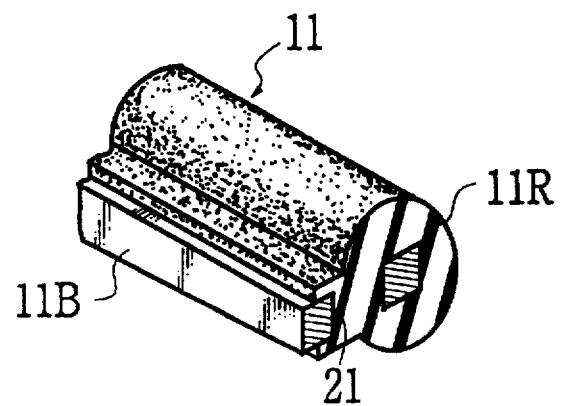
FIG. 5 is a perspective view showing an example of modified packing.

A modified example of the packing 11 is illustrated in FIG. 5. In this example, a plurality of holes 17 is provided in the core portion 11B. The elastic material enters the holes 17 during the formation of the elastic member 11R and expands vertically in the holes 17. Accordingly, the hardened elastic material engages the holes 17 so that the elastic member 11R is firmly secured to the core portion 11B.

As outlined above, the elastic member 11R of the packing 11 is integrally supported by the rigid core portion 11B so that the elastic member 11R can be prevented from bending. Accordingly, even when the elastic member 11R has a long, narrow shape or a complicated three-dimensional shape, such a shape can easily be maintained. For this reason, the packing 11 can be easily positioned and assembled so that an automatic assembly process can be used to assemble the product with good results. In addition, because the shape is maintained, it is possible to systematically pile up a large number of assembly seals and store them in a container such as a cardboard carton. Accordingly, when the seals are removed from the container and transported to and filled into the assembly device, these seals may be easily maintained in regular rows so that they can be very conveniently fed into the assembly device.

As apparent from the above description, it is of course possible to change the width and the thickness of the narrow leaves 15a as necessity arises. In the above-described examples, the packing is received in the recesses formed on the facing ends of the casing 3, 5. However, it is of course possible to construct the packing so that the packing is tightly held between two flat and facing end surfaces of the casings 3, 5.

Figure 6:
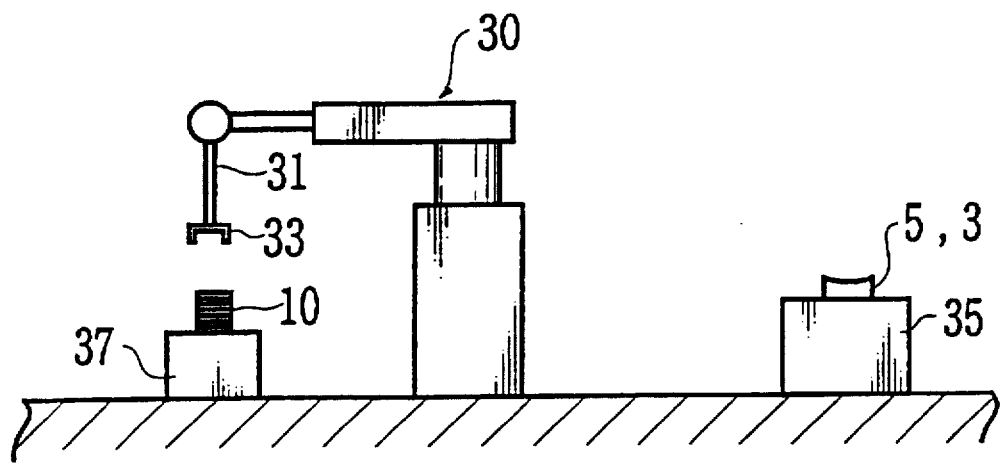
FIG. 6 is a front elevation showing the incorporation of packing using a robot.
Figure 7:
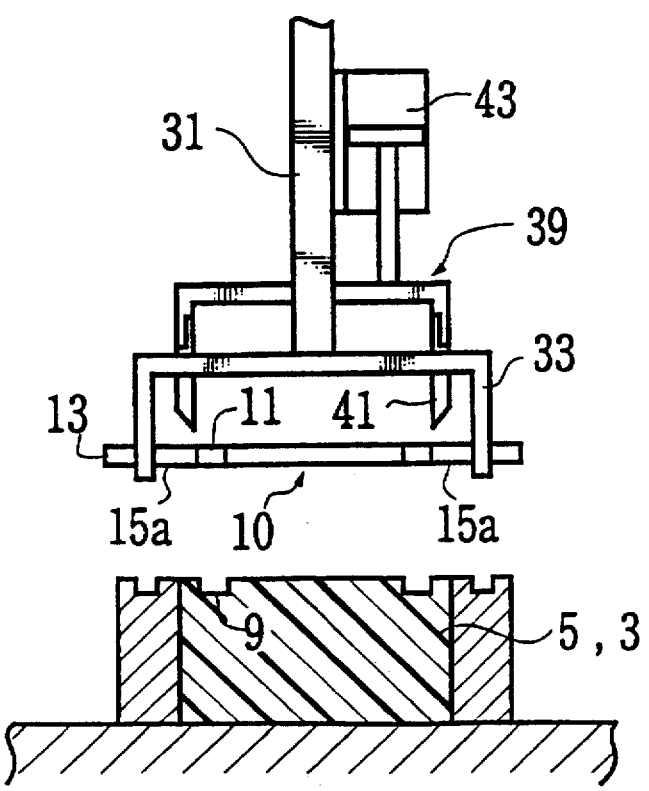
FIG. 7 is an explanatory drawing showing an arm of the robot.

FIG. 6 is an explanatory view showing the conditions of assembling the assembly seal 10 in the casings 3, 5 using an automatic assembly robot 30. FIG. 7 is an explanatory view showing the details of a robot arm 31.

In FIG. 6, the robot 30 comprises the arm 31 which is constructed to allow three-dimensional movement. A holding tool 33 is installed on the tip end of the arm 31 and can maintain the assembly seal 10 horizontally. A conveyor 35 for transporting the assembled parts (for example, the casings 3, 5) and a stand 37 on which the assembly seals 10 are loaded are placed close to the robot 30. When the robot 30 is driven, the holding tool 33 of the arm 31 holds one of the seals 10 on the stand 37 by a method such as clamping or suction or the like, and transports this seal 10 onto the assembly parts. Then, using the pilot hole 17 of the seal 10, the packing 11 is positioned on the portion for sealing the assembly parts.

In addition to the holding tool 33, a cutting device 39 for cutting the connecting portion 15 on the seal 10 is mounted on the arm 31 of the robot 30. The cutting device 39, which is formed so that it can move parallel to the arm 31, has a knife 41 on its lower end. The cutting device 39 is activated by a cylinder 43 mounted on the arm 31. When the cutting device 39 is caused to descend with the packing 11 fitted into a groove 9 in the assembly part (the casing 3 or 5), the connecting portion 15, i.e. the narrow leaves 15a, is cut by the knife 41. In addition, when the arm 31 descends, the arm 31 and the base portion of the seal 10 are removed and the packing 11 remains in the groove 9 of the casing 3.

Figure 8:
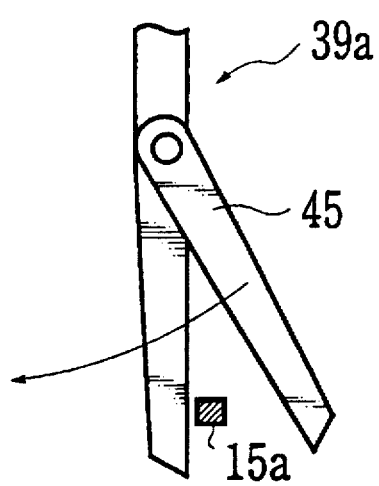
FIG. 8 is an explanatory drawing showing one example of a cutting device provided in the robot arm.
Figure 9:
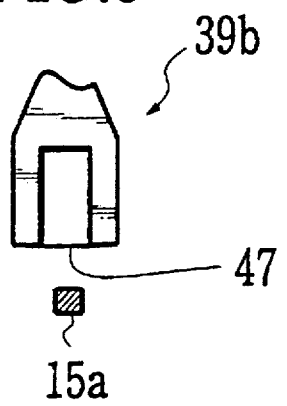
FIG. 9 is an explanatory drawing showing another exampe of a cutting device provided in the robot arm.

FIG. 8 and FIG. 9 are views showing examples of the practical application of the cutting device 39. In FIG. 8, a cutting device 39a is provided with a pair of scissors 45, while a cutting device 39b in FIG. 9 is provided with an electric hot wire capable of melting the connecting portion 15 from heat resulting from the application of an electrical current. In addition, in FIG. 10, a narrow, constricted microjoint portion 15b is formed in each of the narrow leaves 15a of the connecting portion 15 of the seal 10 so that the leaf can be broken off by the application of a small amount of stress.

Figure 10:
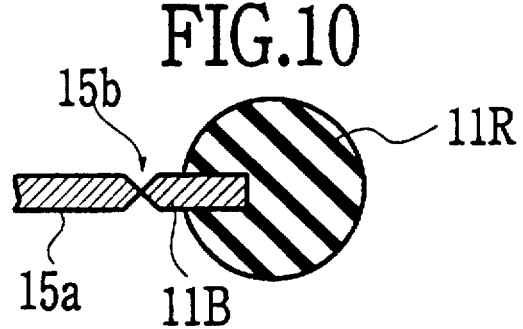
FIG. 10 is an explanatory drawing showing the application side of a connecting portion for the assembly seal; an FIG. 11 is a sectional view showing a second embodiment of the assembly seal of the present invention.

The scissors 45 in FIG. 8 have the advantage of being able to cut in a comparatively smooth manner because force is not applied in the vertical direction on the connecting portion 15 during cutting. If the cutting device 39b in FIG. 9 is used, it is unnecessary to apply any force to the assembly seal during cutting. When the microjoint portion 15b of FIG. 10 is provided, the connecting portion 15 can be cut off by lifting the base portion 13 while pressing lightly against the packing 11. Accordingly, if the assembly process is made up so that the one casing 5 is set onto the other casing 3 on which the seal 10 has been placed, for example, it is possible to eliminate the cutting device from the assembly device 30.

When the above-described seal is included, the position of the assembly parts is fixed, and assembly may be performed by moving the seal 10, and, of course, by moving the assembly parts with respect to the seal 10 held on the arm 31.

Figure 11:
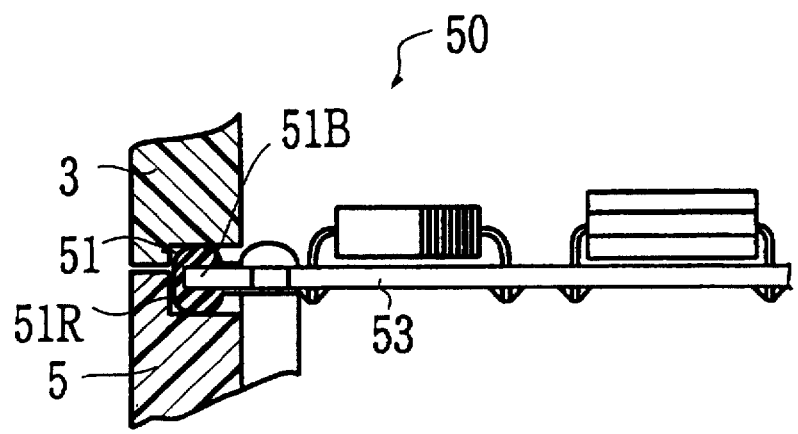

FIG. 11 is a vertical cross-sectional view showing a second embodiment of the assembly seal of the present invention. In this embodiment, the base portion is provided inside the core portion. In more detail, an assembly seal 50 comprises packing 51, and a plate-shaped base portion 53 extending to the inside of the packing 51. The base portion serves a double purpose as an electronic substrate. Accordingly, it is unnecessary to separate the base portion 53 and the packing 51. In this type of application, a design conforming to the service is suitable. For example, it is possible to position a pilot hole provided in the base portion 53 to also be used as a hole for an installation screw. Also, in the case where an elastic member 51R is formed from vulcanized rubber, a high temperature heating process of about 80° C. to 150° C. is required to correct the shape of the elastic member 51R, therefore consideration must be given to the manufacturing process for the assembly seal so that the installation on the base portion 53 for electronic parts is carried out after the vulcanization of the elastic member 51R.

As outlined in the foregoing, in the assembly seal of the present invention, the shape of the packing is not broken down because the packing is provided with a rigid core portion which becomes the core of the elastic member. As a result, packing of a complicated shape is easily installed in assembled parts using an automatic assembly device such as a robot hand or the like. Also, because the packing is joined to and supported on the base portion, there is very little chance of damage when the packing is stored or transported. In addition, because the shape of the base portion is not limited by the shape of the packing, even if the packing has a complicated shape, the base portion itself can be formed into a simple shape which is easy to arrange or pile. Furthermore, because the connecting portion joined to the packing is formed so that it can be easily cut, there is also the advantage that an automatic assembly process can be used. By integrally forming the core portion, the connecting portion, and the base portion from the same material, the assembly seal is easily produced at low cost. The assembly seal is produced at low cost and high precision by composite molding of the elastic member of the packing around the core portion.

It must be understood that the invention is in no way limited to the above embodiments and that many changes may be brought about therein without departing from the scope of the invention as defined by the appended claims.

What is claimed is:

1. A seal for use in the assembly, said seal comprising:

a packing being formed in a predetermined shape from an elastic material to be adapted for sealing engagement between opposite faces of said assembly, the elastic material including a rubber which is being selected from the group consisting of natural rubber, synthetic rubber and silicone rubber;

a core being provided in said packing and being formed of a thermoplastic resin to have substantial rigidity such that said core can maintain the predetermined shape of said packing; and a removable base being integrally formed of the same thermoplastic resin with said core through a plurality of narrow leaves such that said base supports said packing and is easily removed from said core by a cutting operation, said base being formed into a shape so that when said packing is between opposite faces of said assembly, said base extends a selected distance outside of said assembly such that said base can be removed from said core when opposite faces of said assembly are mated.

2. The seal as claimed in claim 1, wherein each of the narrow leaves is provided with a portion which is narrowly constricted so that the leaves may be cut off by the application of light stress.

3. The seal as claimed in claim 1, wherein the core has engaging means for preventing separation of the core from the packing with engagement between the core and the packing.

4. The seal as claimed in claim 3, wherein the engaging means includes a through-hole provided in the core so that the packing can penetrate the core.

5. The seal as claimed in claim 1, wherein the predetermined shape of the packing is such that, when the packing is incorporated in a set of assembled parts, the packing can tightly seal the assembled parts.

* * * * *